United States Patent
Shimamori et al.

(10) Patent No.: US 10,871,812 B2
(45) Date of Patent: Dec. 22, 2020

(54) POWER SUPPLY CIRCUIT AND ELECTRONIC DEVICE

(71) Applicant: FUJITSU LIMITED, Kawasaki (JP)

(72) Inventors: Hiroshi Shimamori, Yokosuka (JP); Kazuya Okamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 103 days.

(21) Appl. No.: 16/395,293

(22) Filed: Apr. 26, 2019

(65) Prior Publication Data

US 2019/0369687 A1    Dec. 5, 2019

(30) Foreign Application Priority Data

May 30, 2018    (JP) .................................. 2018-103360

(51) Int. Cl.
*H02M 1/00*    (2006.01)
*G06F 1/26*    (2006.01)
*H02M 3/158*    (2006.01)

(52) U.S. Cl.
CPC ............ *G06F 1/26* (2013.01); *H02M 3/1582* (2013.01)

(58) Field of Classification Search
CPC .................................... G06F 1/26; H02M 1/10
See application file for complete search history.

(56) References Cited

U.S. PATENT DOCUMENTS

| | | | |
|---|---|---|---|
| 2007/0097577 A1 | 5/2007 | Peng et al. | |
| 2015/0326011 A1 | 11/2015 | Tajiri | |
| 2016/0259353 A1* | 9/2016 | Morroni | ................ H02M 3/285 |
| 2020/0083740 A1* | 3/2020 | Sultenfuss | .............. G06F 1/263 |

FOREIGN PATENT DOCUMENTS

| | | |
|---|---|---|
| JP | 2007-124787 | 5/2007 |
| JP | 2015-23766 | 2/2015 |
| JP | 2015-216719 | 12/2015 |

* cited by examiner

*Primary Examiner* — Albert Wang
(74) *Attorney, Agent, or Firm* — Fujitsu Patent Center

(57) ABSTRACT

A power supply circuit includes a first power supply line that couples a first input node from which first input power is input and an output node to each other, a second power supply line that couples a second input node from which second input power is input and the output node to each other, a power limit of the second input power being higher than that of the first input power, a converter that is inserted in the first power supply line and that converts a voltage of the first input power input from the first input node to a higher voltage or a lower voltage, an adjustment circuit that adjusts an output voltage of the converter to a voltage higher than a voltage of the second input power input from the second input node.

10 Claims, 7 Drawing Sheets

POWER SUPPLY CIRCUIT AND ELECTRONIC DEVICE

CROSS-REFERENCE TO RELATED APPLICATION

This application is based upon and claims the benefit of priority of the prior Japanese Patent Application No. 2018-103360, filed on May 30, 2018, the entire contents of which are incorporated herein by reference.

FIELD

The embodiment discussed herein is related to a power supply circuit and an electronic device.

BACKGROUND

A known electric power supply apparatus is equipped with a power combining unit that combines multiple power inputs supplied from multiple power sources into a single unit of power and supplies the single unit of power to an electrical load.

A maximum power supply (power limit) is determined for a power source. However, it is difficult for the known technology to supply to a load the power as much as the total power limit obtained by adding power limits of multiple power sources.

The following is a reference document.
[Document 1] Japanese Laid-open Patent Publication No. 2007-124787.

SUMMARY

According to an aspect of the embodiments, a power supply circuit includes a first power supply line that couples a first input node from which first input power is input and an output node to each other, a second power supply line that couples a second input node from which second input power is input and the output node to each other, a power limit of the second input power being higher than that of the first input power, a converter that is inserted in the first power supply line and that converts a voltage of the first input power input from the first input node to a higher voltage or a lower voltage, an adjustment circuit that adjusts an output voltage of the converter to a voltage higher than a voltage of the second input power input from the second input node; a first rectifier circuit that is inserted in the first power supply line to direct a forward direction of the first rectifier circuit to a direction from the converter to the output node, a second rectifier circuit that is inserted in the second power supply line to direct a forward direction to a direction of the second rectifier circuit from the second input node to the output node, and a control circuit that controls a voltage on an output node side of the first rectifier circuit and a voltage on an output node side of the second rectifier circuit to be identical to each other.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, an electronic device according to the present disclosure is describe by using a peripheral component interconnect (PCI) card as an example.

The PCI card operates with the power of 3.3 Vce/3 A/10 W and 12 Vce/5.5 A/65 W supplied via the card edge of the PCI card. However, in recent years, servers and supercomputers have enhanced their performances. In response to this, a high power PCI card in which a connector is added and the power of 12 Vex/18.75 A/225 W is supplied from, for example, a server through a cable has been introduced.

However, the two different 12 V power source voltages (12 Vce and 12 Vex) differ from each other in the server-side power supply source, the voltage accuracy, and the output current limit, in addition, there is a voltage difference of 1.92 V at the maximum, and thus, the use of the two different 12 V power source voltages in parallel is not a simple task. Therefore, it is desired to efficiently use two different 12 V power source voltages with different power supply specifications in the PCI card.

| Voltage | Voltage accuracy | Supply current | Supply power | Voltage difference |
|---|---|---|---|---|
| 3.3 Vce | | 3 A | 10 W | — |
| 12 Vce | ±8% | 5.5 A | 65 W | 1.92 V or less *[1] |
| 12 Vex | +5%/−8% | 18.75 A | 225 W | |

*[1] the difference between two voltages of 12 V (for example, when 12 Vce is +8% and 12 Vex is −5%, the difference is 1.92 V)

Figure 1:
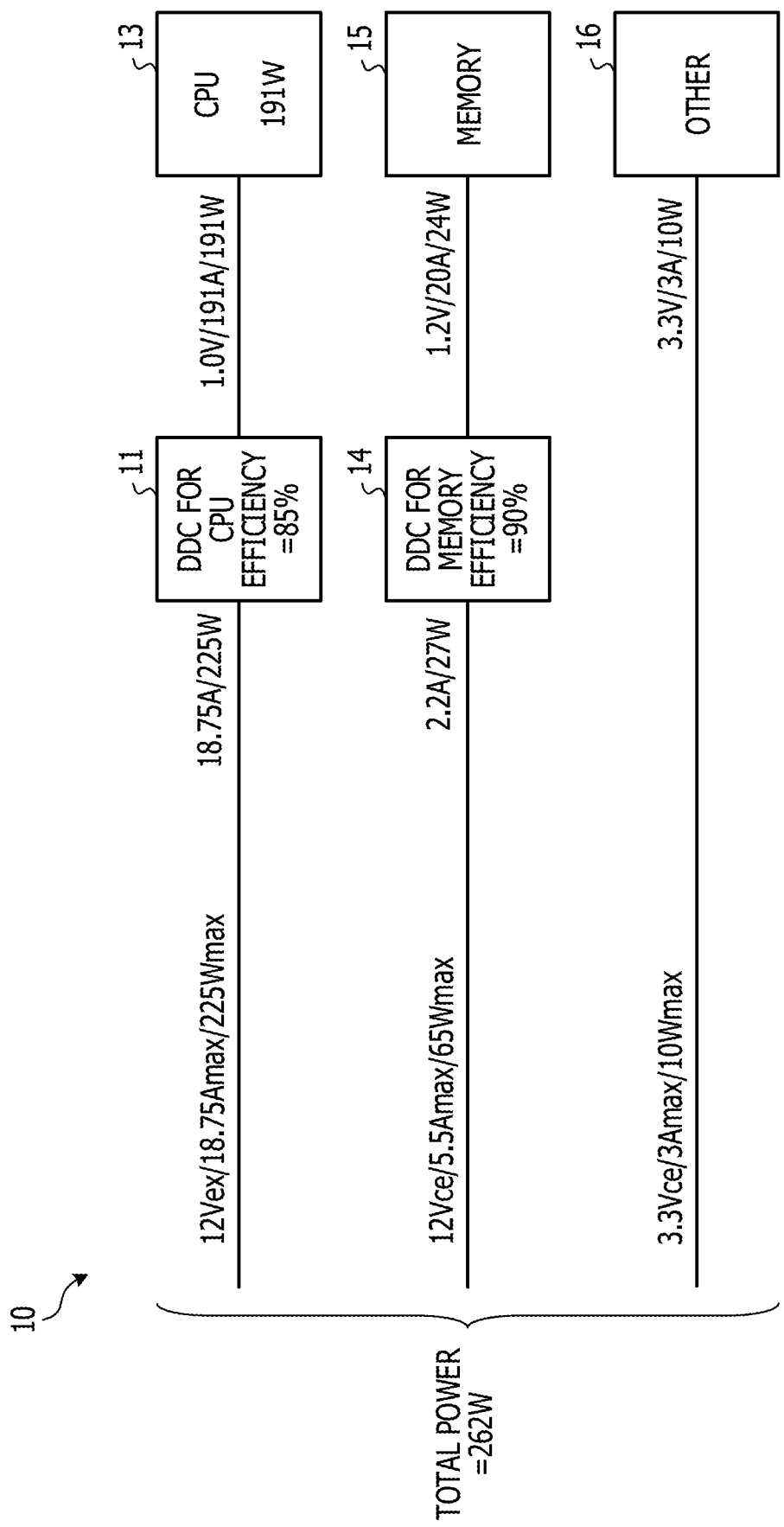
FIG. 1 is a circuit block diagram illustrating a configuration example of an electronic device of a first comparative example.
Figure 2:
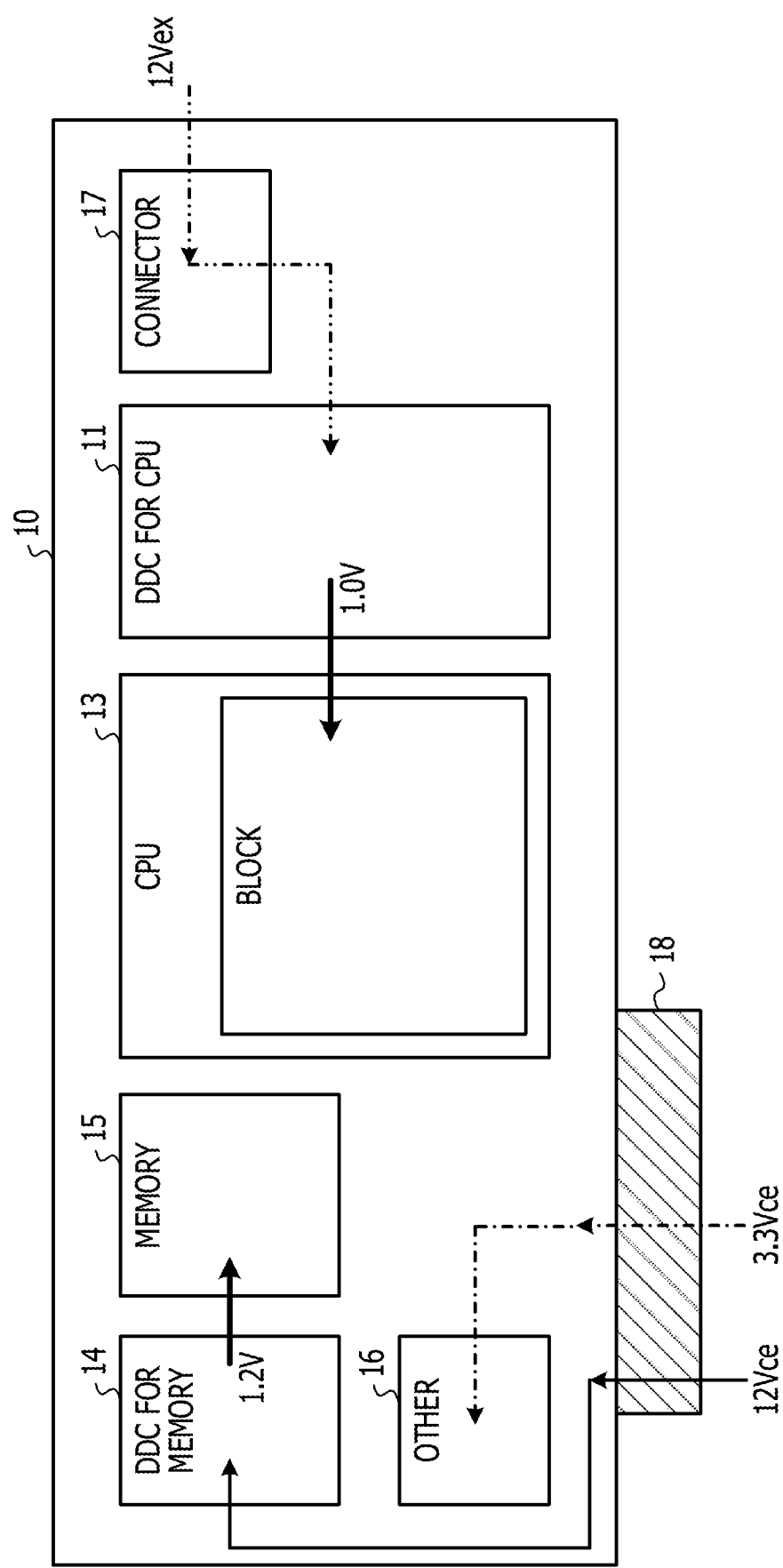
FIG. 2 is a structural block diagram illustrating a configuration example of the electronic device of the first comparative example.

FIG. 1 is a circuit block diagram illustrating a configuration example of an electronic device of a first comparative example compared with the embodiment. FIG. 2 is a structural block diagram illustrating a configuration example of the electronic device of the first comparative example. FIGS. 1 and 2 illustrate a PCI card 10 of a high power card as an example of the electronic device.

The PCI card 10 includes a central processing unit (CPU) 13, a DC-DC converter (DDC) 11 for the CPU 13, a memory 15, a DDC 14 for the memory 15, another circuit 16, such as a system control circuit. The DDC 11, to which 12 Vex is supplied via a connector 17, and the CPU 13, to which power is supplied from the DDC 11, operate with power equal to or lower than the power limit of 225 Wmax (denoted as 225 W in FIG. 1). The DDC 14, to which 12 Vce is supplied via the card edge 18, and the memory 15, to which power is supplied from the DDC 14, operate with power equal to or less than the power limit of 65 Wmax (denoted as 27 W in FIG. 1). The other circuit 16, to which 3.3 Vce as a 3.3 V power source voltage is supplied directly via the card edge 18, operates with power equal to or less than the power limit of 10 Wmax (denoted as 10 W in FIG. 1). In this manner, the PCI card 10 is used with the total power (denoted as 262 W (=225 W+27 W+10 W) in FIG. 1) equal to or less than the total power limit of 300 Wmax.

However, with this configuration, there is no suppliable power margin (225 Wmax≈225 W) of the power source that supplies 12 Vex. Thus, although there is a suppliable power margin (65 Wmax>27 W) of the power source that supplies 12 Vce, it is difficult to install in the PCI card 10 the CPU 13 that consumes more power. More specifically, it is not possible to increase in excess of the upper power limit (225 Wmax) the power at 12 Vex that is supplied from, for example, a server, and therefore, it is difficult to install in the PCI card 10 the CPU 13 with higher power consumption and higher performance. While the CPU 13 is operating, the CPU 13 consumes more power than that of the memory 15, whereas the memory 15 consumes more power than that of the CPU 13 while the memory 15 is being accessed. Accordingly, although the maximum power at 12V that the PCI card 10 is able to consume is 290 W (=225 Wmax+65 Wmax), the power that the PCI card 10 is actually able to use (consume) is as low as approximately 80% to 50% of the maximum power.

Figure 3:
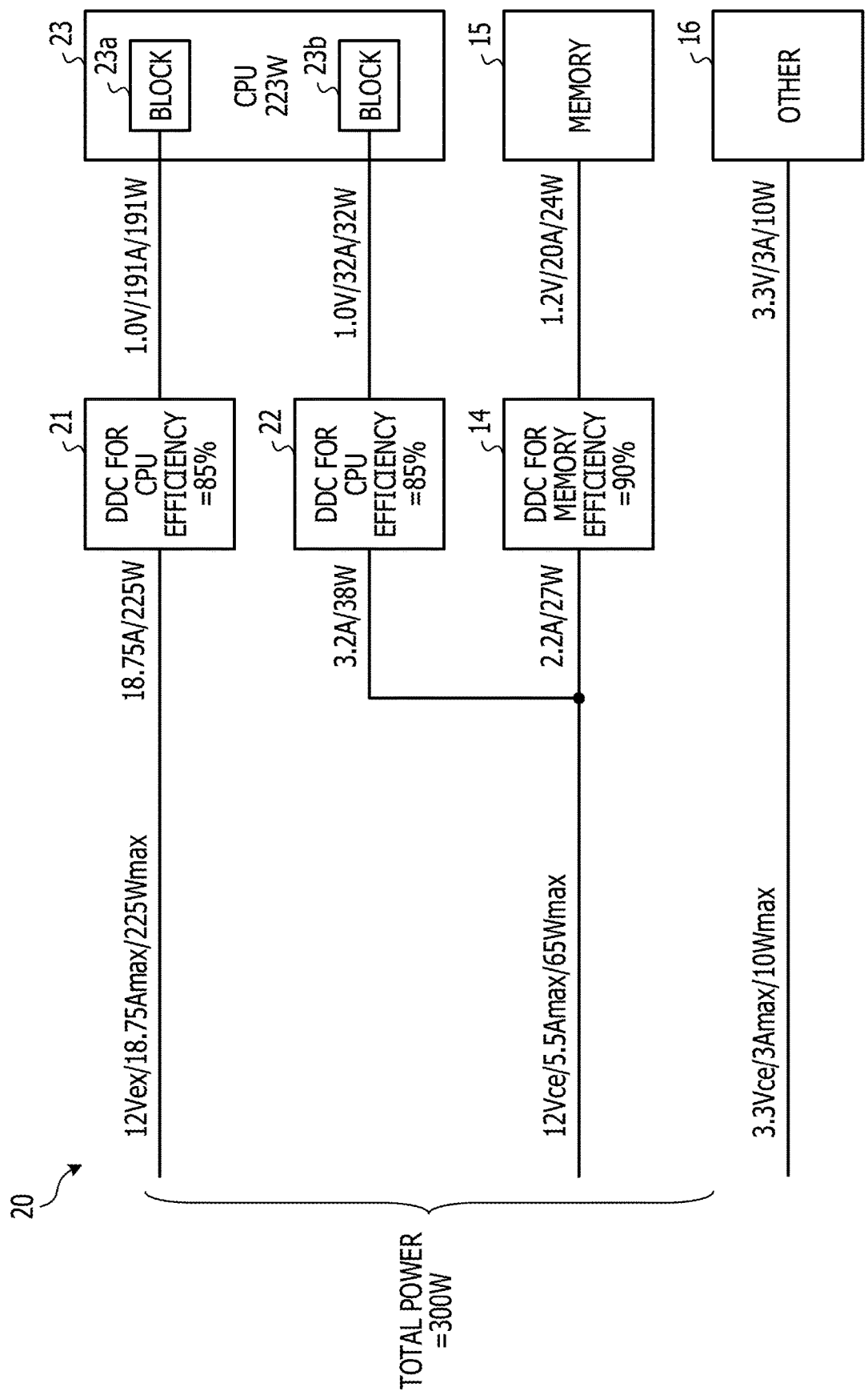
FIG. 3 is a circuit block diagram illustrating a configuration example of an electronic device of a second comparative example.
Figure 4:
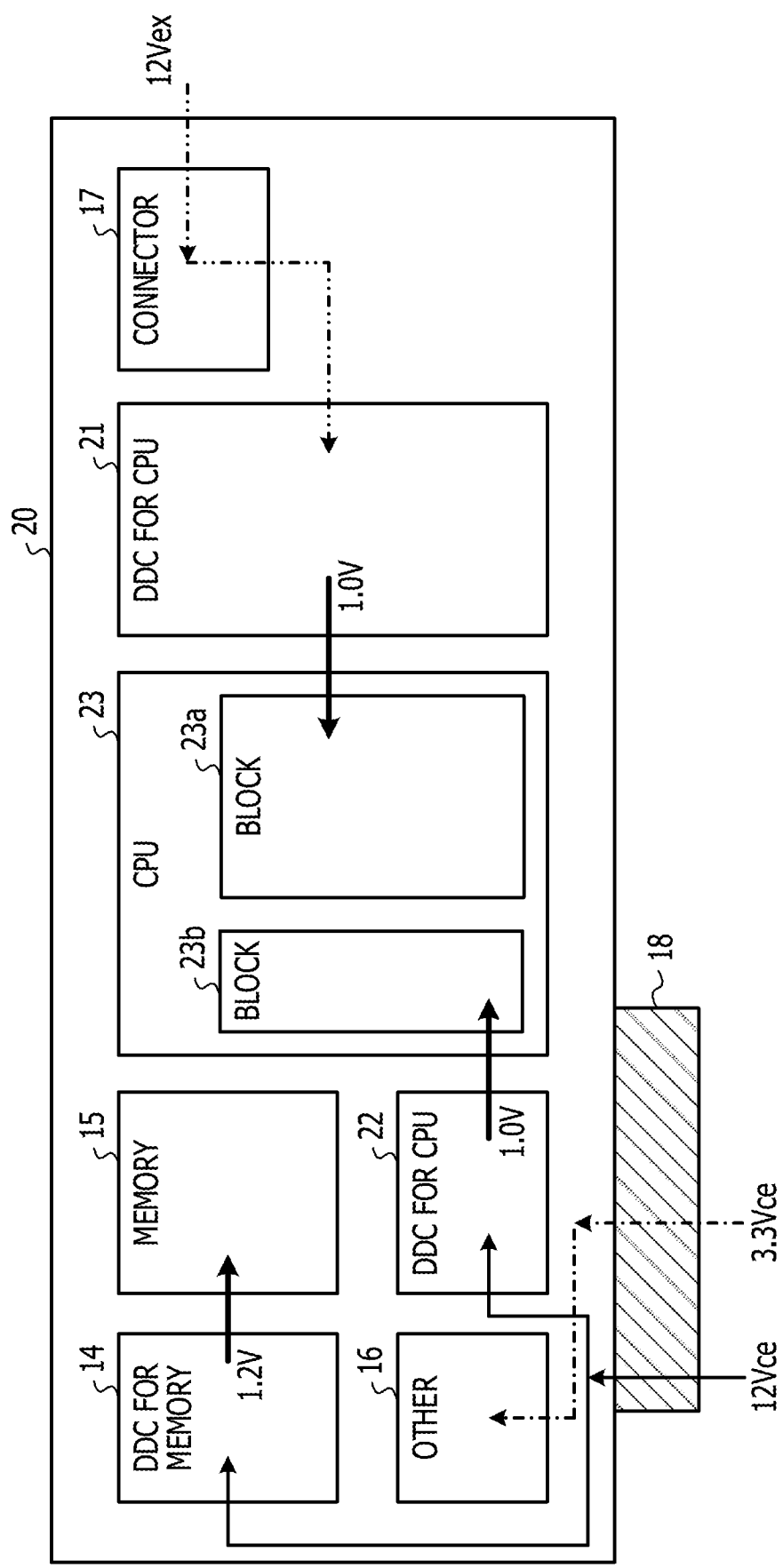
FIG. 4 is a structural block diagram illustrating a configuration example of the electronic device of the second comparative example.

As a solution that addresses such an issue, a configuration illustrated in FIGS. 3 and 4 is, for example, considered. FIG. 3 is a circuit block diagram illustrating a configuration example of an electronic device of a second comparative example compared with the embodiment. FIG. 4 is a structural block diagram illustrating a configuration example of the electronic device of the second comparative example. FIGS. 3 and 4 illustrate a PCI card 20 of a high power card as an example of the electronic device.

In the PCI card 20, the circuit of a CPU 23 is divided into two blocks 23a and 23b. Specifically, the PCI card 20 contains the dedicated CPU 23 having a special configuration in which the block 23a receives power from a DDC 21 receiving 12 Vex and the block 23b receives power from the DDC 22 receiving 12 Vce. By developing the dedicated CPU 23 having such a special configuration, it is possible to install in the PCI card the CPU with relatively high power consumption and high performance.

However, developing the special dedicated CPU that receives power from both the DDC 21 using power at 12 Vex and the DDC 22 using power at 12 Vce as illustrated in FIGS. 3 and 4 leads to a large amount of development cost and the increase in the number of man-hours for development and the product price.

The configuration of the PCI card according to the embodiment is such that multiple power sources that use 12 V and have different power supply sources, different voltage accuracy, and different current limits operate in parallel by using a combining circuit to which a load is coupled. This configuration enables the increase in output power suppliable to the load. With this configuration, it is possible to supply to the load the power as much as the total of the power limits of the multiple power sources that use 12 V. As a result, without developing a dedicated CPU, it is possible to install in the PCI card a load such as a CPU with relatively high power consumption and high performance.

Examples of the load with relatively high power consumption and high performance include processors, such as a CPU, a graphics processing unit (GPU), and a deep learning unit (DLU). The load may be a large scale integrated circuit including a processor or another kind of electrical load.

Figure 5:
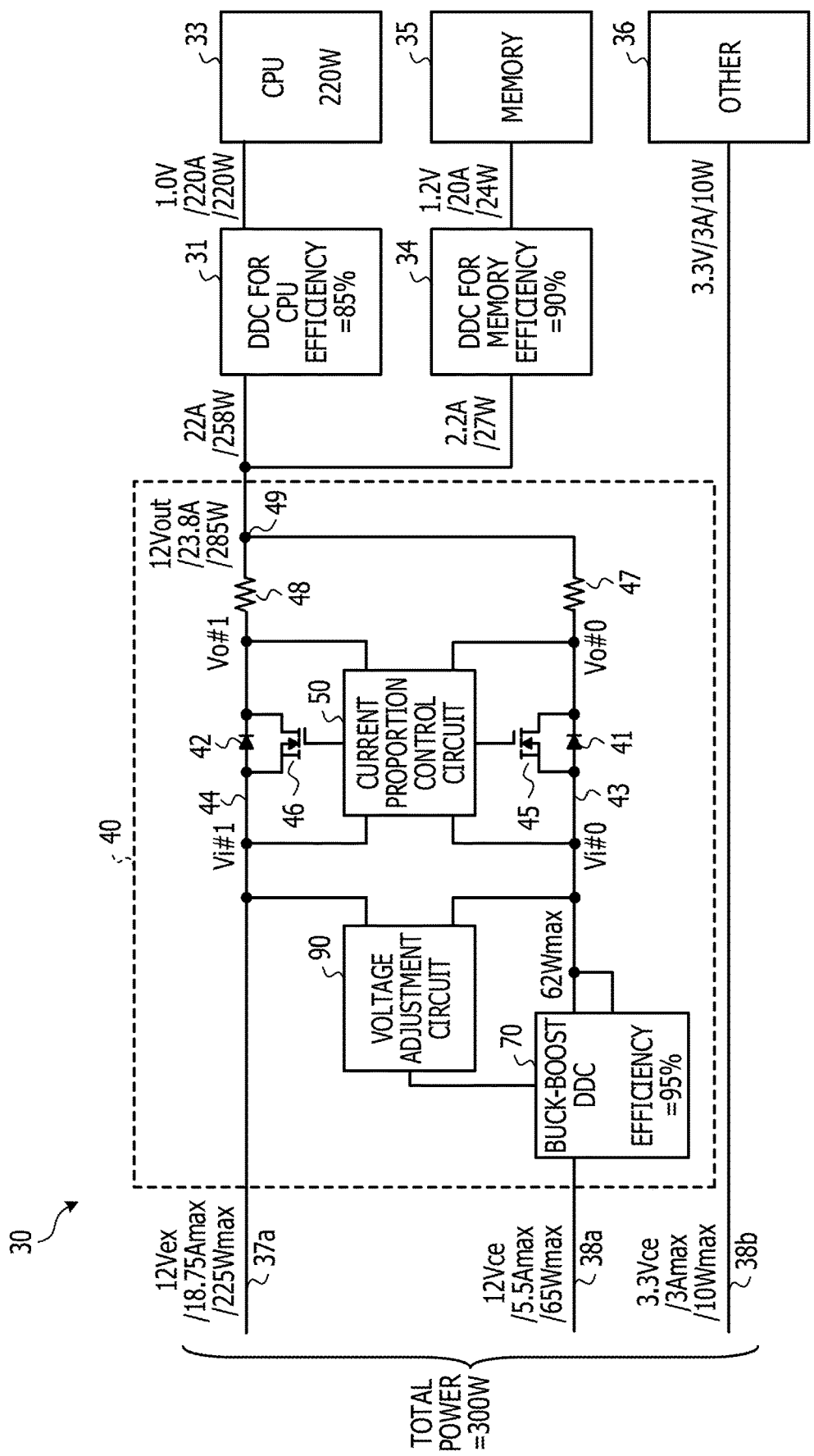
FIG. 5 is a circuit block diagram illustrating a configuration example of an electronic device of an embodiment.
Figure 6:
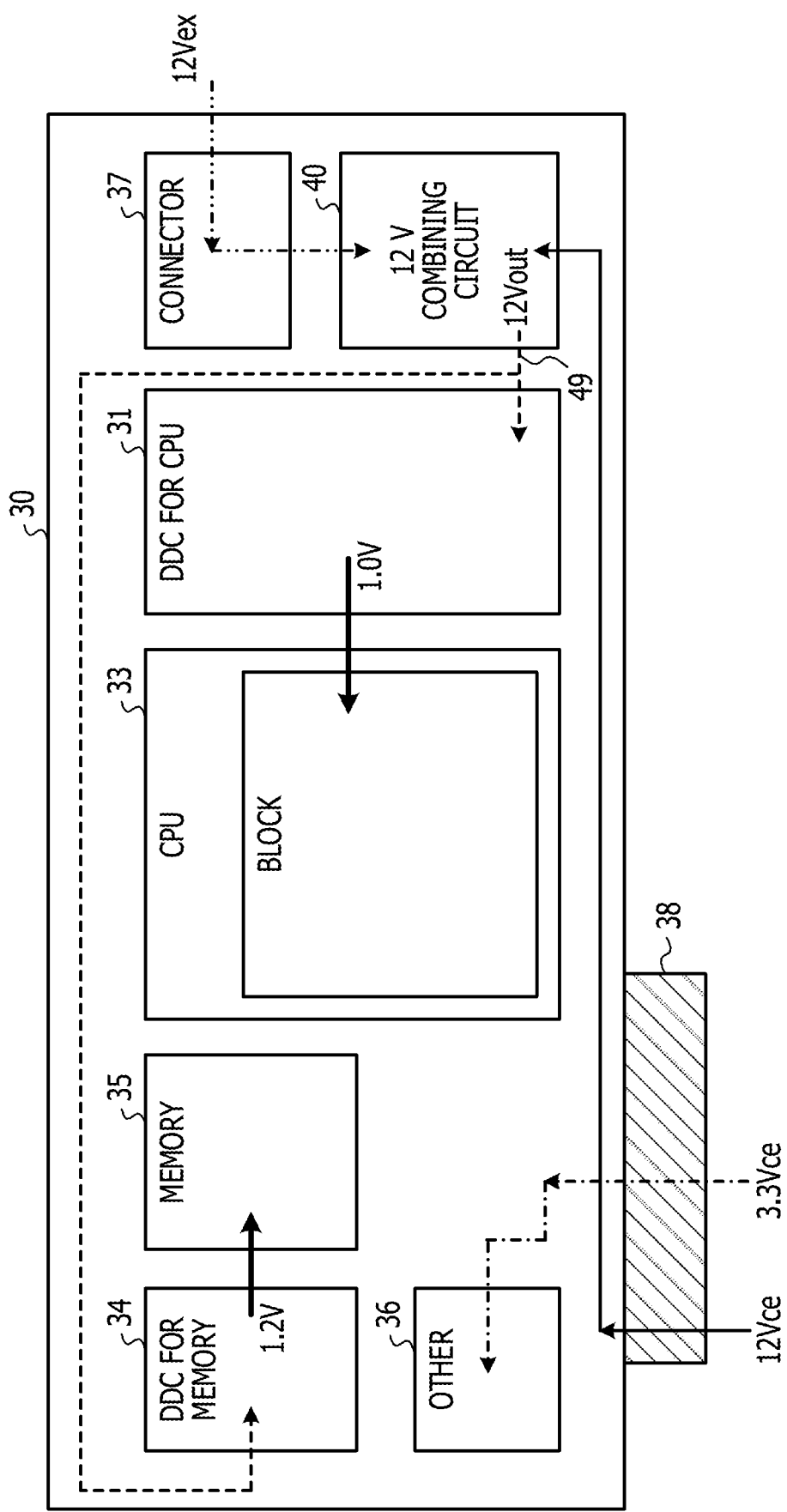
FIG. 6 is a structural block diagram illustrating a configuration example of the electronic device of the embodiment.

Next, a configuration of a PCI card according to the embodiment is described with reference to FIGS. 5 and 6. FIG. 5 is a circuit block diagram illustrating a configuration example of the PCI card as an example of the electronic device. FIG. 6 is a structural block diagram illustrating a configuration example of the PCI card as an example of the electronic device. A PCI card 30 of a high power card is illustrated in FIGS. 5 and 6.

As illustrated in FIGS. 5 and 6, the PCI card 30 includes a CPU 33, a DDC 31 for the CPU 33, a memory 35, a DDC 34 for the memory 35, another circuit 36 such as a system control circuit, a card edge 38, a connector 37, and a combining circuit 40. The CPU 33 is an example of a first device, the memory 35 is an example of a second device, and the other circuit 36 is an example of a third device.

The combining circuit 40 combines voltages of multiple power inputs whose power limits are different from each other and supplies DC power at a combined output voltage (12 Vout) via the output node 49 to a load. The combining circuit 40 is an example of a power supply circuit. The combining circuit 40 according to the embodiment combines the voltage (12 Vce) of first input power W1 that is input from a first input node 38a and the voltage (12 Vex) of second input power W2 that is input from a second input node 37a as illustrated in FIG. 5.

The first input node 38a is, for example, a first terminal of the card edge 38 or a first wiring connected to the first terminal. A first power source, such as a server, that supplies the first input power W1 is connected to the first input node 38a. The first input power W1 is, for example, source power at a first power source voltage of 12 V (12 Vce). In the embodiment, the first power source has a capacity to supply power of 12 Vce/5.5 Amax/65 Wmax. More specifically, the first direct-current input power W1 at a direct current voltage of 12 V is supplied by the first power source, in which the maximum current (the current limit) suppliable from the first power source is the direct current of 5.5 A and the maximum power (the power limit) suppliable from the first power source is the direct current power of 65 W.

The second input node 37a is, for example, a second terminal of the connector 37 or a second wiring connected to the second terminal. The connector 37 includes, for example, eight terminal pins and the second terminal is one of the eight terminal pins. A second power source that supplies the second input power W2 is connected to the second input node 37a. The second input power W2 is, for example, source power at a second power source voltage of 12 V (12 Vex). In the embodiment, the second power source has a capacity to supply the power of 12 Vex/18.75 Amax/225 Wmax. More specifically, the second direct-current input power W2 at a direct current voltage of 12 V is supplied by the second power source, in which the maximum current (the current limit) suppliable from the second power source is the direct current of 18.75 A and the maximum power (the power limit) suppliable from the second power source is the direct current power of 225 W. The power limit of the second input power W2 is set at a level higher than the power limit of the first input power W1 (225 Wmax>65 Wmax).

The third input node 38b is, for example, a third terminal of the card edge 38 or a third wiring connected to the third terminal. A third power source that supplies third input power W3 is connected to the third input node 38b. The third input power W3 is, for example, source power at a power source voltage of 3.3 V (3.3 Vce). In the embodiment, the third power source has a capacity to supply the power of 3.3 Vce/3 Amax/10 Wmax. More specifically, the third direct-current input power W3 at a direct current voltage of 3.3 V is supplied by the third power source, in which the maximum current (the current limit) suppliable from the third power source is the direct current of 3 A and the maximum power (the power limit) suppliable from the third power source is the direct current power of 10 W.

In order to not cause the current to flow in a reverse direction for the purpose of combining the voltage (12 Vce) of the first input power W1 and the voltage (12 Vex) of the second input power W2, the combining circuit 40 includes a pair of power supply lines in which a first diode 41 and a second diode 42 are respectively inserted.

The first diode 41 is an example of a first rectifier element and inserted in a first power supply line 43 in such a manner that the direction from the first input node 38a to the output node 49 is the forward direction. The second diode 42 is an example of a second rectifier element and inserted in a second power supply line 44 in such a manner that the direction from the second input node 37a to the output node 49 is the forward direction. The first diode 41 and the second diode 42 each form an OR-ing diode.

The first power supply line 43 is a power supply path connecting the first input node 38a and the output node 49 and the second power supply line 44 is a power supply path connecting the second input node 37a and the output node 49. The output end of the first power supply line 43 and the output end of the second power supply line 44 are connected to each other at the output node 49 and the current flowing through the first power supply line 43 and the current flowing through the second power supply line 44 are joined together at the output node 49.

The combining circuit 40 also includes a first transistor 45 connected in parallel with the first diode 41, a second transistor 46 connected in parallel with the second diode 42, a control circuit 50 that controls the first transistor 45 and the second transistor 46.

A first parallel circuit in which the first diode 41 and the first transistor 45 are connected in parallel with each other is an example of a first rectifier circuit. The first parallel circuit is inserted in the first power supply line 43 in such a manner that the direction from the first input node 38a to the output node 49 is the forward direction. A second parallel circuit in which the second diode 42 and the second transistor 46 are connected in parallel with each other is an example of a second rectifier circuit. The second parallel circuit is inserted in the second power supply line 44 in such a manner that the direction from the second input node 37a to the output node 49 is the forward direction.

The first transistor 45 is an example of a first switching element and the second transistor 46 is an example of a second switching element. The first transistor 45 and the second transistor 46 are both, for example, field effect transistors (FETs). The first transistor 45 connected in parallel with the first diode 41 and the second transistor 46 connected in parallel with the second diode 42 each form an OR-ing FET.

In the embodiment, the first transistor 45 and the second transistor 46 are both N-channel metal oxide semiconductor (MOS) FETs. The first transistor 45 has a source connected to the anode of the first diode 41, a drain connected to the cathode of the first diode 41, and a gate connected to the control circuit 50. The second transistor 46 has a source connected to the anode of the second diode 42, a drain connected to the cathode of the second diode 42, and a gate connected to the control circuit 50.

The first transistor 45 and the second transistor 46 are both not limited to FETs and may be another kind of switching elements, such as bipolar transistors.

By rerouting the current to also flow through the first transistor 45 and the second transistor 46, the control circuit 50 reduces the voltage drop that occurs in the first diode 41 and the second diode 42 and consequently decreases the power loss. When it is detected that reverse voltage is applied across the first transistor 45, the control circuit 50 turns off the first transistor 45. In contrast, when it is detected that reverse voltage is applied across the second transistor 46, the control circuit 50 turns off the second transistor 46. The control circuit 50 hinders current flowing in a reverse direction by performing such control for hindering the reverse flow (that is, turning off the transistor when it is detected that reverse voltage is applied to the transistor). The reverse voltage denotes a state where the level of source voltage is lower than the level of drain voltage.

The control circuit 50 causes the first transistor 45 and the second transistor 46 to operate in the saturation region or the active region lower than the saturation region. The control circuit 50 controls the voltage drop occurring between the source and the drain of each of the first transistor 45 and the second transistor 46 to be within the active region or the saturation region so as to equalize the drain voltage of the first transistor 45 and the drain voltage of the second transistor 46. The drain voltage (Vo #0) of the first transistor 45 is the voltage on the output node 49 side of the first rectifier circuit and the drain voltage (Vo #1) of the second transistor 46 is the voltage on the output node 49 side of the second rectifier circuit. In the combining circuit 40, Vo #0 and Vo #1 that have been controlled to be identical to each other are combined together after flowing through respective resistors (a first resistor 47 and a second resistor 48).

The first resistor 47 is inserted between the first rectifier circuit (the first transistor 45 and the first diode 41) and the output node 49 in the first power supply line 43. The second resistor 48 is inserted between the second rectifier circuit (the second transistor 46 and the second diode 42) and the output node 49 in the second power supply line 44.

In the combining circuit 40, Vo #0 and Vo #1 that have been controlled to be identical to each other are combined together after flowing through the respective resistors (the first resistor 47 and the second resistor 48), and as a result, the ratio of the values of the currents flowing through the respective resistors is consistent depending on the ratio of the resistance values of the resistors. Specifically, in a case where Vo #0 and Vo #1 are controlled to be the same voltage, when the resistance of the first resistor 47 and the resistance of the second resistor 48 are both 1 mΩ, the value of current flowing through the first resistor 47 and the value of current flowing through the second resistor 48 are identical to each other. The ratio of the value of the current flowing through the resistor 47 and the value of the current flowing through the resistor 48 is in proportion to the reciprocal of the ratio of the resistance values of the resistors 47 and 48. For example, since it is assumed in this example that the rated maximum current with respect to 12 Vce and the rated maximum current with respect to 12 Vex are respectively 5.5 A and 18.75 A, when the resistance of the resistor 47 and the resistance of the resistor 48 are 3.4 mΩ and 1 mΩ, the ratio of the value of the current flowing through the resistor 47 and the value of the current flowing through the resistor 48 is 1:3.4. As described above, the resistance of the first resistor 47 is set at a value greater than the resistance of the second resistor 48.

However, this configuration has two problems because there is the maximum voltage difference of 1.92 V between 12 Vce and 12 Vex as indicated in the above table.

The first problem is that, when the voltage drop occurring in a transistor (the voltage across the transistor) is equal to or more than the forward direction voltage (for example, 0.6 V) across a diode connected in parallel with the transistor, the diode turns on and it is thus not possible to control the voltage between the source and the drain of the transistor.

The second problem is that, if it is possible to control the voltage between the source and the drain of the transistor, in the state in which 12 Vex is greater than 12 Vce (1.92 V difference at maximum), the maximum value of power dissipation P of the second transistor 46 is 36 W (=1.92 V×18.75 A), which exceeds the practical range.

To address these two problems, the combining circuit 40 includes a buck-boost DDC 70 that converts the voltage of the first input power W1 whose power limit is lower than the other to a higher level or a lower level and an adjustment circuit 90 that adjusts the voltage output from the buck-boost DDC 70.

The buck-boost DDC 70 is an example of a converter and is inserted in the first power supply line 43 to which the first input power W1 whose power limit is lower than the other is input. The adjustment circuit 90 adjusts an output voltage Vi #0, which is output by the buck-boost DDC 70, to a level slightly higher than an input voltage Vi #1 (12 Vex), which is input from the second input node 37*a*. The adjustment circuit 90 monitors the input voltage Vi #1 and controls the output voltage Vi #0 to be at a level slightly higher (for example, 100 mV higher) than the input voltage Vi #1. The adjustment circuit 90 controls the buck-boost DDC 70 to operate in a boost mode or a buck mode in accordance with the level of the input voltage Vi #1.

Accordingly, since the voltage difference between Vi #0 and Vi #1 is limited to a slight difference about 100 mV (Vi #0=Vi #1+100 mV), the second transistor 46 operates almost within the saturation region, and as a result, it is possibly to considerably reduce power dissipation of the second transistor 46. For example, when it is assumed that the voltage across the second transistor 46 in the saturation region is 10 mV, it is possible to limit the maximum power dissipation of the second transistor 46 to 0.2 W (=10 mV×18.75 Amax). At the same time, it is possible to limit the maximum power dissipation of the first transistor 45 to 0.55 W (=100 mV×5.5 Amax), which is a very small unit of power dissipation.

The control circuit 50 controls the proportion of the current flowing in the first transistor 45 and the current flowing in the second transistor 46. The control circuit 50 controls the voltage drop that occurs in the second transistor 46 to be decreased by controlling the second transistor 46 placed on the lower voltage side (Vi #1) to operate almost within the saturation region. By contrast, the control circuit 50 controls the voltage drop that occurs in the first transistor 45 to be increased by controlling the first transistor 45 placed on the higher voltage side (Vi #0) to operate in the active region, which is a relatively lower region. The control circuit 50 maintains the relationship of Vo #0=Vo #1 by performing such current proportion control. Since Vi #1 with a higher current limit and a higher power limit is consistently controlled to be lower than Vi #0, the second transistor 46 consistently operates almost within the saturation region. As a result, although a large amount of current flows through the second transistor 46, it is possible to considerably reduce power dissipation in the second transistor 46.

Accordingly, regardless of applying a known configuration to the buck-boost DDC 70, the maximum power dissipation of the buck-boost DDC 70 is limited to about 3 W (=65 Wmax−62 Wmax), and thus, it is possible to suppress the total power dissipation of the combining circuit 40. Consequently, the combining circuit 40 enables power supplied to a load from the output node 49 to be increased to a level (denoted as 285 W in FIG. 5) close to the total power limit 290 W (=225 Wmax+65 Wmax) obtained by adding together the power limits of multiple external 12V power sources.

The PCI card 10 includes loads that each operate with the power supplied from the output node 49 of the combining circuit 40. FIG. 5 illustrates the DDC 31, the CPU 33, the DDC 34, and the memory 35 as an example of the loads. The DDC 31 is an example of a first buck converter and converts the voltage of the power supplied from the output node 49 to a lower level. For example, the DDC 31 converts the voltage of 12V output from the output node 49 to 1 V. The CPU 33 is an example of a processor and the power whose voltage is converted by the DDC 31 to a lower level is supplied to the CPU 33. The DDC 34 is an example of a second converter and converts the voltage of the power supplied from the output node 49 to a lower level. For example, the DDC 34 converts the voltage of 12V output from the output node 49 to 1.2 V. Power is supplied to the memory 35 after the voltage of the power has been converted to a lower level by the DDC 34.

As a result, although it is possible to install the CPU of up to about 191 W in the configuration in FIG. 1, it is possible to install in the configuration in FIG. 5, for example, a load such as the CPU 33 of about 220 W, which is 30 W greater than that of the former case.

Figure 7:
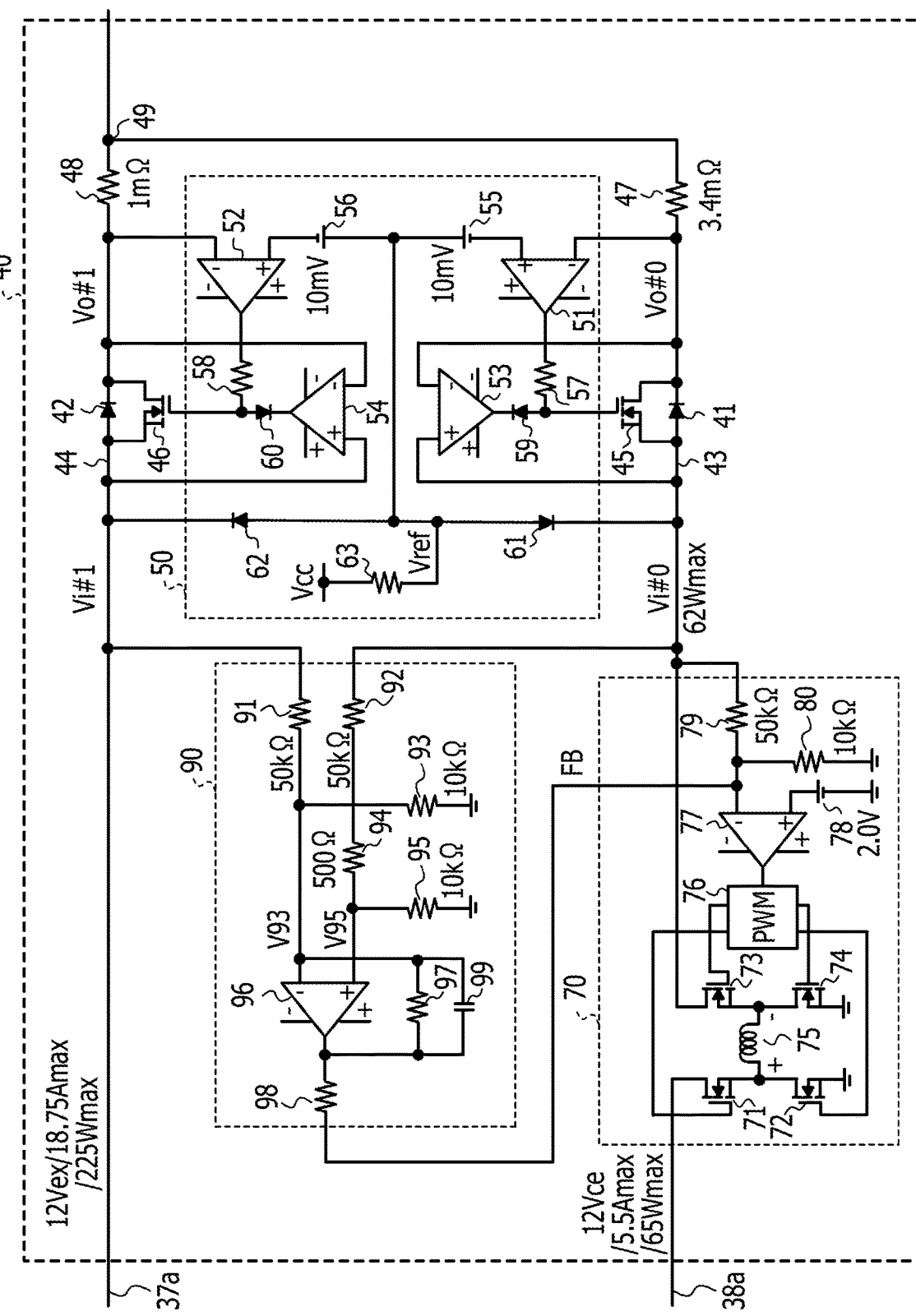
FIG. 7 is a circuit block diagram illustrating a specific configuration example of a power supply circuit of the embodiment.

FIG. 7 is a circuit block diagram illustrating a specific example of the components in the combining circuit 40 illustrated in FIGS. 5 and 6.

The buck-boost DDC 70 includes an H-bridge circuit containing switching elements 71 to 74 and an inductor 75 and a pulse width modulation (PWM) controller 76 that controls voltage conversion operation of the H-bridge circuit. The buck-boost DDC 70 also includes an operational amplifier 77 that controls the PWM controller 76, a voltage source 78, and resistors 79 and 80.

When the voltage of 12 Vce is higher than the reference voltage 12 V, the buck-boost DDC 70 performs buck operation. When the voltage of 12 Vce is lower than the reference voltage 12 V, the buck-boost DDC 70 performs boost operation. In this manner, the buck-boost DDC 70 controls the output voltage Vi #0 to be consistently level with the reference voltage value 12 V. The reference voltage 12 V is determined in accordance with the voltage V78 of the voltage source 78.

When the voltage V78 is 2.0 V, the resistance R79 of the resistor 79 is 50 kΩ, the resistance R80 of the resistor 80 is 10 kΩ, the value of the output voltage Vi #0 is controlled to be a value calculated as follows.

$$Vi\ \#0 = (V78/R80) \times (R79+R80) = (2.0/10\ \text{k}) \times (50\ \text{k} + 10\ \text{k}) = 12.0\ V$$

The adjustment circuit 90 that adjusts the output voltage Vi #0 of the buck-boost DDC 70 includes an operational amplifier 96, resistors 91 to 95, 97, and 98, and a capacitor 99.

By using, as the reference voltage, 12 Vex (Vi #1) that is input via the connector 37 of the PCI card 30, the adjustment circuit 90 sets the output voltage Vi #0 at a level approximately 100 mV higher than Vi #1 (Vi #0=Vi #1+100 mV). The operational amplifier 96 generates an adjustment signal FB for setting the output voltage Vi #0 at the level approximately 100 mV higher than Vi #1.

In other words, the adjustment circuit 90 controls the output voltage Vi #0 of the buck-boost DDC 70 to equalize a voltage V95 of a non-inverting terminal of the operational amplifier 96 and a voltage V93 of an inverting terminal of the operational amplifier 96. The voltage V93 of the inverting terminal of the operational amplifier 96 varies depending on the value of Vi #1. When Vi #1 is 12 V, resistance R91 of the resistor 91 is 50 kΩ, and resistance R93 of the resistor 93 is 10 kΩ, the value of the voltage V93 is calculated as follows.

$$V93=(Vi\ \#1 \times R93)/(R91+R93)=(12 \times 10\ k)/(50\ k+10\ k)=2.0\ V$$

The voltage V95 of the non-inverting terminal of the operational amplifier 96 and the output voltage Vi #0 of the buck-boost DDC 70 are calculated as follows.

$$V95 = V93 = 2.0\ V$$

$$Vi\#0 = (V95/R95) \times (R92 + R94 + R95)$$
$$= (2.0/10k) \times (50k + 500 + 10k)$$
$$= 12.1\ V$$

As described above, the output voltage Vi #0 of the buck-boost DDC 70 is controlled to be consistently at a level 100 mV higher than Vi #1.

The resistor 97, the capacitor 99, and the resistor 98 forms a gain/phase adjustment circuit for stably controlling the output voltage Vi #0 of the buck-boost DDC 70.

The control circuit 50, which controls the proportion of the current flowing in the first transistor 45 and the current flowing in the second transistor 46, includes operational amplifiers 51 to 54, voltage sources 55 and 56, resistors 57, 58, and 63, and diodes 59 to 62. The control circuit 50 has two main functions.

The first function is an OR-FET function (reverse flow hindering function). The first diode 41 and the second diode 42 are both OR-ing diodes. The first transistor 45 is connected in parallel with the first diode 41 and the second transistor 46 is connected in parallel with the second diode 42. The voltage between the source and the drain of the first transistor 45 and the voltage between the source and the drain of the second transistor 46 are monitored respectively by the operational amplifiers 53 and 54. When the voltage at the source terminal of the first transistor 45 is higher than the voltage at the drain terminal of the first transistor 45, the operational amplifier 53 controls the gate voltage of the first transistor 45 to be at a higher level and the first transistor 45 accordingly turns on. Conversely, when the voltage at the source terminal of the first transistor 45 is lower than the voltage at the drain terminal of the first transistor 45, the operational amplifier 53 controls the gate voltage of the first transistor 45 to be at a lower level and the first transistor 45 accordingly turns off. The operation described above is OR-diode operation with reduced voltage drop.

The second function is that at least one of the first transistor 45 and the second transistor 46 operates as a series regulator and voltage drop between the source and the drain is controlled and Vo #0 and Vo #1 are equalized. Vref is the reference voltage of this function and generated by using the resistor 63 and ideal diodes 61 and 62. Specifically, the lower voltage of Vi #0 and Vi #1 is the reference voltage Vref. The anode of the ideal diode 61 and the anode of the ideal diode 62 are both connected to a fixed voltage Vcc via the resistor 63, the cathode of the ideal diode 61 is connected to the anode of the first diode 41, and the cathode of the ideal diode 62 is connected to the anode of the second diode 42. The anode of the ideal diode 61 and the anode of the ideal diode 62 are connected respectively to the positive sides of the voltage sources 55 and 56. A voltage V55 of the voltage source 55 and a voltage V56 of the voltage source 56 are set at levels slightly higher than saturation voltages of the first transistor 45 and the second transistor 46 and are assumed to be 10 mV in this example. The operational amplifiers 51 and 52 return respectively Vo #0 and Vo #1 to adjust the gate voltages of the first transistor 45 and the second transistor 46.

Here, the operation in a case where Vi #1 is 12.0 V and Vi #0 is 12.1 V is described. Vref is accordingly 12.0 V, which is the lower voltage of Vi #0 and Vi #1. The voltage at the non-inverting terminal of the operational amplifier 52 is 11.99 V, which is a value the voltage V56 of the voltage source 56 lower than 12.0 V. Accordingly, Vo #1 is controlled to be at a level calculated as follows.

$$Vo\ \#1=Vi\ \#1-V56=12.0\ V-10\ mV=11.99\ V$$

Similarly, Vo #0 is controlled to be at a level obtained by using Vref−V55, that is, Vo #0=Vo #1=11.99 V.

Therefore, the value of voltage drop between the source and the drain of the first transistor 45 is calculated as follows.

$$Vi\ \#0-Vo\ \#0=12.1\ V-11.99\ V=0.11\ V$$

Finally, Vo #0 and Vo #1, which have been controlled to be identical to each other, are applied respectively to the resistors 47 and 48, and the output voltage (12 Vout) is subsequently generated. Depending on the ratio of the resistance of the first resistor 47 and the resistance of the second resistor 48, the proportion of the current flowing the respective resistors is maintained. Since in this specific example the resistance of the first resistor 47 and the resistance of the second resistor 48 are 3.4 mΩ, and 1 mΩ, power is supplied from the output node 49 to the loads while the proportion of the maximum currents of the two 12 V external power sources, which is 5.5 A:18.7 A, is maintained.

As described above, in the embodiment, a buck-boost DDC is placed on 12 Vce side, which is the lower-current-supply-capacity side, and Vi #0 on the lower-current-supply-capacity side is set at a level about 100 mV higher than Vi #1 on the higher-current-supply-capacity side. The voltage drop across the transistor on the higher-current-supply-capacity side, which is the Vi #1 side, is controlled to be at a level close to a saturation voltage, and the voltage drop across the transistor on the Vi #0 side is controlled to be at a higher level.

With this configuration, the power dissipation of the respective components are determined, for example, as follows:

the power dissipation of the first transistor 45: 0.605 W (=110 mV×5.5 A), the power dissipation of the first resistor 47: 0.1 W (=5.5 A×5.5 A×3.4 mΩ), the power dissipation of the second transistor 46: 0.2 W (=10 mV×18.75 A), the power dissipation of the second resistor 48: 0.4 W (=18.75 A×18.75 A×1 mΩ), the power dissipation of the buck-boost DDC 70: 3 W (=65 W−62 W), and the internal power dissipation of the combining circuit 40: 4.305 W (=0.605 W+0.1 W+0.2 W+0.4 W+3 W).

Accordingly, the efficiency of the combining circuit 40 is given as follows.

Efficiency=(total input power−internal power dissipation)/total input power=(225 W+66 W−4.305 W)/(225 W+66 W)=98.52%

Therefore, it is possible to provide a high-efficiency combining circuit.

The power supply circuit and the electronic device are described above in accordance with the embodiment, but the present embodiment is not limited to the example described above. Various modification and improvements such as combination or replacement with part or all of another embodiment may be made within the scope of the present embodiment.

For example, as an example of the electronic device, the PCI card is used in the embodiment described above, but the electronic device is not limited to the PCI card and may be any electronic device. Specific examples of the electronic device include information and communication technology (ICT) devices and in-vehicle devices. More specific examples include a communication base station, a server, a motherboard, a personal computer, and a mobile terminal device.

Furthermore, the multiple power inputs that are supplied to the combining circuit 40 are all power inputs at 12 V in the embodiment described above but may differ from each other with regard to voltage.

Moreover, the component inserted in each of the first power supply line and the second power supply line is not limited to a diode and may be any rectifier element, such as a thyristor.

Further, the first rectifier circuit may include the first switching element that is inserted in the first power supply line and that contains a body diode. Similarly, the second rectifier circuit may include the second switching element that is inserted in the second power supply line and that contains a body diode. In other words, the diode connected in parallel with a switching element may be a body diode (parasitic diode) contained in the switching element. Specific examples of the switching element containing a body diode include a MOS FET.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power supply circuit comprising:
    a first power supply line that couples a first input node from which first input power is input and an output node to each other;
    a second power supply line that couples a second input node from which second input power is input and the output node to each other, a power limit of the second input power being higher than that of the first input power;
    a converter that is inserted in the first power supply line and that converts a voltage of the first input power input from the first input node to a higher voltage or a lower voltage;
    an adjustment circuit that adjusts an output voltage of the converter to a voltage higher than a voltage of the second input power input from the second input node;
    a first rectifier circuit that is inserted in the first power supply line to direct a forward direction of the first rectifier circuit to a direction from the converter to the output node;
    a second rectifier circuit that is inserted in the second power supply line to direct a forward direction to a direction of the second rectifier circuit from the second input node to the output node; and
    a control circuit that controls a voltage on an output node side of the first rectifier circuit and a voltage on an output node side of the second rectifier circuit to be identical to each other.

2. The power supply circuit according to claim 1, wherein
    the first rectifier circuit includes a first rectifier element that is inserted in the first power supply line to direct a forward direction of the first rectifier element to the direction from the converter to the output node and a first switching element that is coupled in parallel with the first rectifier element,
    the second rectifier circuit includes a second rectifier element that is inserted in the second power supply line to direct a forward direction of the second rectifier element to the direction from the second input node to the output node and a second switching element that is coupled in parallel with the second rectifier element, and
    the control circuit controls the first switching element and the second switching element to equalize the voltage on the output node side of the first rectifier circuit and the voltage on the output node side of the second rectifier circuit.

3. The power supply circuit according to claim 1, wherein
    the first rectifier circuit includes a first switching element that is inserted in the first power supply line and that contains a body diode,
    the second rectifier circuit includes a second switching element that is inserted in the second power supply line and that contains a body diode, and
    the control circuit controls the first switching element and the second switching element to equalize the voltage on the output node side of the first rectifier circuit and the voltage on the output node side of the second rectifier circuit.

4. The power supply circuit according to claim 2, wherein
    the control circuit controls the first switching element in a first active region and the second switching element in a second active region close to a saturation region relative to the first active region.

5. The power supply circuit according to claim 1, further comprising:
    a first resistor that is inserted in the first power supply line between the first rectifier circuit and the output node; and
    a second resistor that is inserted in the second power supply line between the second rectifier circuit and the output node, wherein a resistance of the first resistor is greater than a resistance of the second resistor.

6. An electronic device comprising:
a power supply circuit; and
a load that operates with power supplied from an output node of the power supply circuit, wherein
the power supply circuit includes
a first power supply line that couples a first input node from which first input power is input and the output node to each other,
a second power supply line that couples a second input node from which second input power is input and the output node to each other, a power limit of the second input power being higher than that of the first input power,
a converter that is inserted in the first power supply line and that converts a voltage of the first input power input from the first input node to a higher voltage or a lower voltage,
an adjustment circuit that adjusts an output voltage of the converter to a voltage higher than a voltage of the second input power input from the second input node,
a first rectifier circuit that is inserted in the first power supply line to direct a forward direction of the first rectifier circuit to a direction from the converter to the output node,
a second rectifier circuit that is inserted in the second power supply line to direct a forward direction of the second rectifier circuit to a direction from the second input node to the output node, and
a control circuit that controls a voltage on an output node side of the first rectifier circuit and a voltage on an output node side of the second rectifier circuit to be identical to each other.

7. The electronic device according to claim 6, wherein the load includes
a first buck converter that converts a voltage of the power supplied from the output node to a lower voltage,
a first device to which the power is supplied after the voltage of the power has been converted by the first buck converter to the lower voltage,
a second buck converter that converts a voltage of the power supplied from the output node to a lower voltage, and
a second device to which the power is supplied after the voltage of the power has been converted by the second buck converter to the lower voltage.

8. The electronic device according to claim 7, wherein the first device includes a processor, and
the second device includes a memory.

9. A PCI card comprising:
a power supply circuit; and
a load that operates with power supplied from an output node of the power supply circuit, wherein
the power supply circuit includes
a first power supply line that couples a card edge from which first input power is input and the output node to each other,
a second power supply line that couples a connector from which second input power is input and the output node to each other, a power limit of the second input power being higher than that of the first input power
a converter that is inserted in the first power supply line and that converts a voltage of the first input power input from the card edge to a higher voltage or a lower voltage,
an adjustment circuit that adjusts an output voltage of the converter to a voltage higher than a voltage of the second input power input from the connector,
a first rectifier circuit that is inserted in the first power supply line to direct a forward direction of the first rectifier circuit to a direction from the converter to the output node,
a second rectifier circuit that is inserted in the second power supply line to direct a forward direction of the second rectifier circuit to a direction from the connector to the output node, and
a control circuit that controls a voltage on an output node side of the first rectifier circuit and a voltage on an output node side of the second rectifier circuit to be identical to each other.

10. The PCI card according to claim 9, wherein the load includes
a first buck converter that converts a voltage of the power supplied from the output node to a lower voltage,
a processor to which the power is supplied after the voltage of the power has been converted by the first buck converter to the lower voltage,
a second buck converter that converts a voltage of the power supplied from the output node to a lower voltage, and
a memory to which the power is supplied after the voltage of the power has been converted by the second buck converter to the lower voltage.

* * * * *